United States Patent [19]

Mizoguchi

[11] Patent Number: 5,502,525
[45] Date of Patent: Mar. 26, 1996

[54] SHUTTER BLADES FOR INCREASING UNIFORMITY OF OBLIQUE INCIDENT LIGHT

[75] Inventor: Yoshiyuki Mizoguchi, Kanagawa, Japan

[73] Assignee: Canon Kabushiki Kaisha, Tokyo, Japan

[21] Appl. No.: 229,395

[22] Filed: Apr. 18, 1994

Related U.S. Application Data

[63] Continuation of Ser. No. 855,420, Mar. 23, 1992, abandoned.

[30] Foreign Application Priority Data

Mar. 27, 1991 [JP] Japan .................................. 3-062903
Mar. 27, 1991 [JP] Japan .................................. 3-062904

[51] Int. Cl.$^6$ ........................................ G03B 9/40
[52] U.S. Cl. .......................... 354/247; 354/230; 348/366
[58] Field of Search ..................... 354/226, 228, 354/230, 245, 246, 247, 248, 265, 270, 271.1, 272, 273, 274; 348/363, 364, 365, 366

[56] References Cited

U.S. PATENT DOCUMENTS

4,058,817  11/1977  Johnson et al. ................. 354/230 X

Primary Examiner—Howard B. Blankenship
Attorney, Agent, or Firm—Robin, Blecker, Daley and Driscoll

[57] ABSTRACT

In a photographing device of the kind having a plurality of blades disposed one after another in an overlapping manner in the direction of the optical axis of a photo-taking lens, with an exposing aperture part for high luminance included in an exposing aperture hole formed in each of the blades, and performing exposure control for an exposure surface by driving and moving these blades relative to each other in the direction of traversing the optical axis, the fore end positions, relative to the optical axis, of the exposing aperture parts for high luminance included in the exposing aperture holes formed respectively in the blades are arranged to be located farther away from the optical axis accordingly as the blades are located farther away from the exposure surface.

4 Claims, 5 Drawing Sheets

OBLIQUE LIGHT L     APERTURE D     OBLIQUE LIGHT R

SHUTTER BLADES FOR INCREASING UNIFORMITY OF OBLIQUE INCIDENT LIGHT

This is a continuation application under 37 CFR 1.62 of prior application Ser. No. 07/855,420, filed Mar. 23, 1992, now abandoned.

BACKGROUND OF THE INVENTION

1. Field of the Invention

This invention relates to a photographing device of the kind performing exposure control with a plurality of blades.

2. Description of the Related Art

Figure 1:
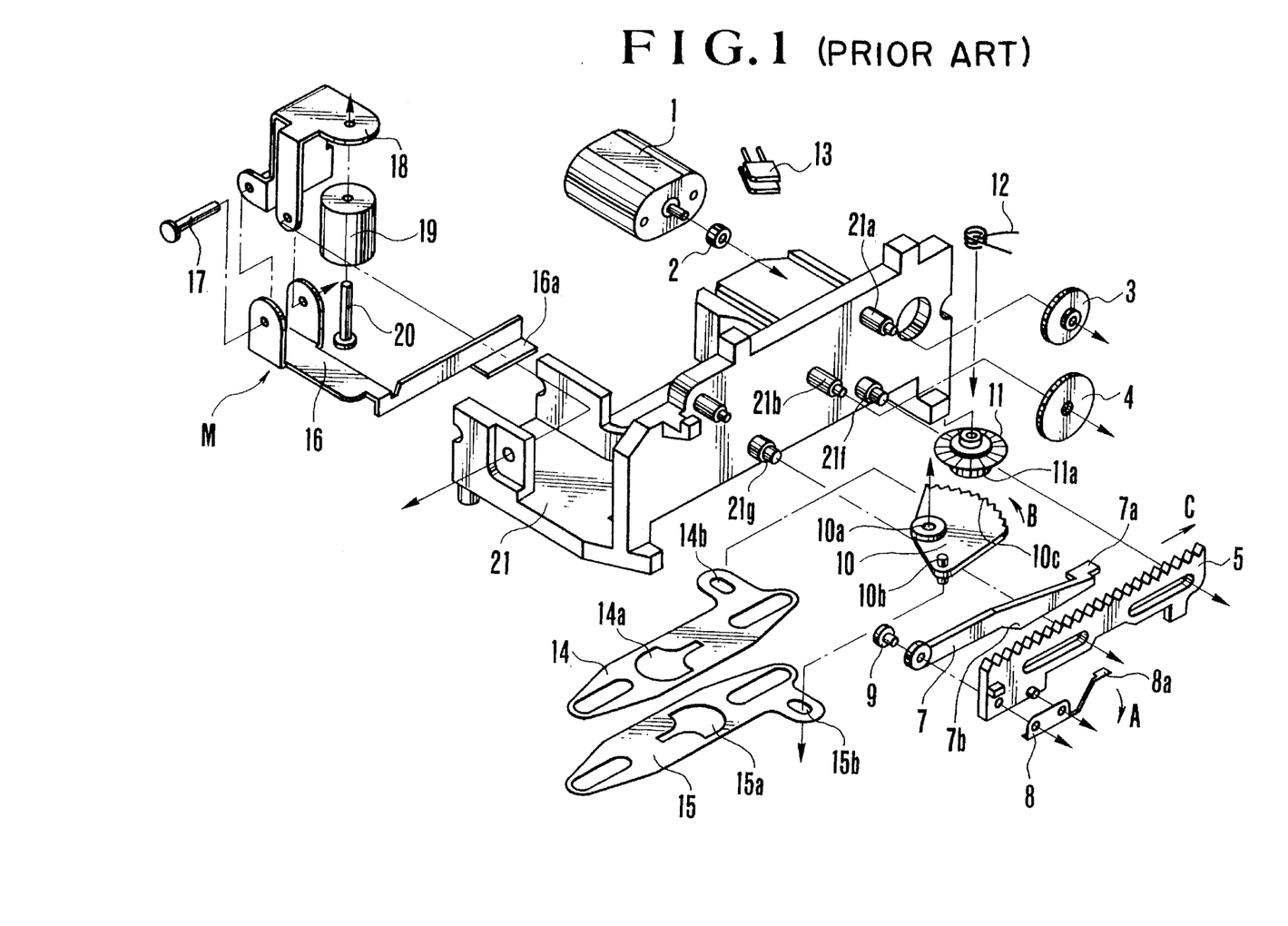
FIG. 1 is an exploded oblique view showing the arrangement of essential parts of the conventional photographing device.
Figure 2:
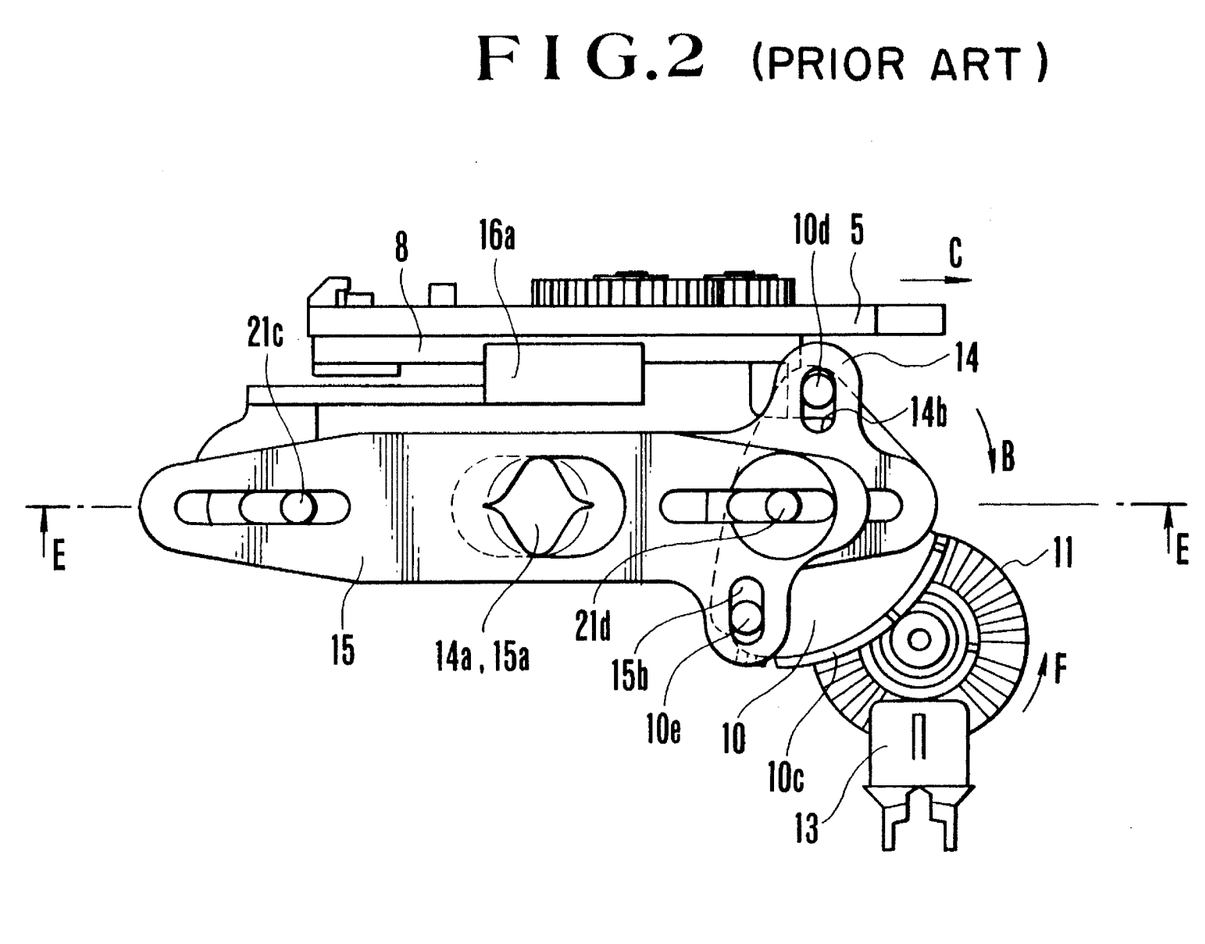
FIG. 2 is a plan view showing the arrangement of the essential parts of the conventional photographing device.

FIGS. 1 and 2 of the accompanying drawings show, in an exploded oblique view and a plan view, the arrangement of the essential parts of the conventional photographing device. The device is of the kind having a plurality of blades with an exposing aperture hole formed in each of the blades and is arranged to control the amount of exposure of a light receiving part such as a film, a CCD or the like by driving these blades.

Referring to FIGS. 1 and 2, a motor 1 is arranged to perform a shutter opening action and is secured to a base plate 21. A pinion gear 2 is fitted on the shaft of the motor 1 with pressure and is arranged to cause a rack gear 5 to slide along shafts 21g and 21f provided on the base plate 21 through first and second reduction gears 3 and 4 which are fitted on gear shafts 21a and 21b provided on the base plate 21. A clutch 7 and a clutch spring 8 are mounted on the rack gear 5 by means of a shaft 9. The clutch spring 8 has a spring piece 8a which engages the clutch 7 and is arranged to urge the clutch 7 to turn clockwise, i.e., in the direction of arrow A as shown in FIG. 1.

A shutter plate 10 is arranged to turn around a hole 10a in the direction of arrow B as shown in FIG. 1 when a projection 10b provided on the shutter plate 10 is pushed by the end part 7a of the clutch 7. A gear 10c which is formed along the peripheral part of the shutter plate 10 is arranged to drive the gear part 11a of a pulse plate 11. The pulse plate 11 is provided with a return spring 12 and a photointerrupter 13 which is arranged to read the bright-and-dark pattern formed on the pulse plate 11.

Two shutter blades 14 and 15 (hereinafter referred to as blades) respectively have exposing aperture holes 14a and 15a (hereinafter referred to as aperture holes) which are formed to define an aperture, and include exposing aperture parts 14c and 15c for high luminance (hereinafter referred to as high luminance aperture parts), and slots 14b and 15b which are arranged to be driven by projections 10d and 10e provided on the shutter plate 10 as shown in FIG. 2 and to be guided by shafts 21c and 21d provided on the base plate 21.

Figure 3A:
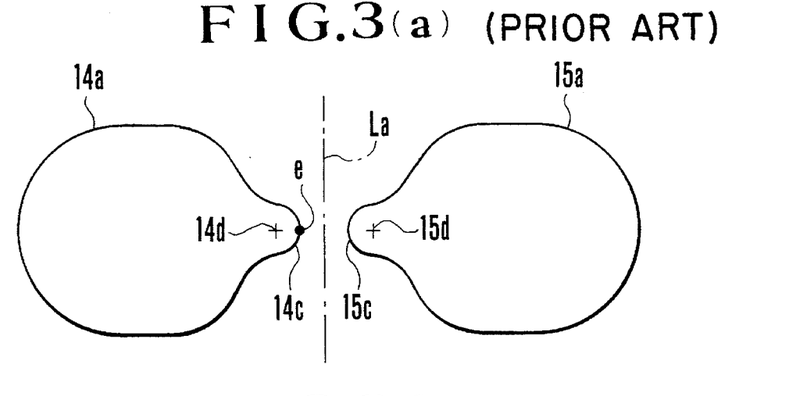
FIGS. 3(a) and 3(b) show the arrangement of exposing aperture holes of the conventional photographing device.

As shown in FIG. 3(a), the aperture holes 14a and 15a which are formed in the blades 14 and 15 to include the high luminance aperture parts 14c and 15c are in the same shape and symmetrically arranged relative to an optical axis La.

Figure 3B:
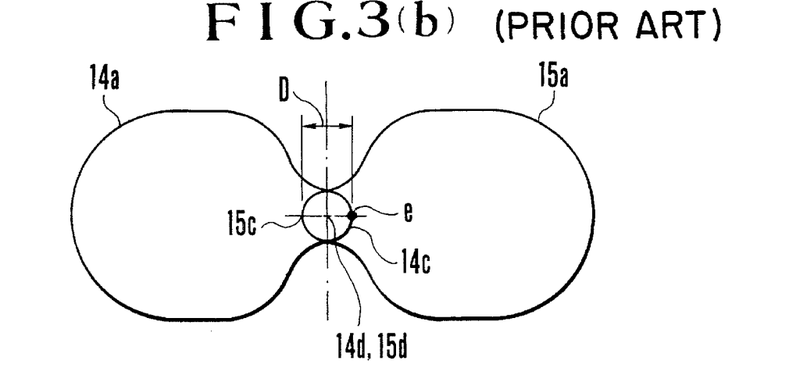

The positions of the slots 14b and 15b of the blades 14 and 15 in relation to the shafts 10d and 10e of the shutter plate 10 are arranged to be such that, when the blades 14 and 15 are moved in parallel to each other by the rotation of the shutter plate 10, an aperture is formed by the high luminance aperture parts 14c and 15c in a shape which is symmetrical relative to the optical axis La as shown in FIG. 3(b).

With the blades 14 and 15 moved in parallel by the rotation of the shutter plate 10 at the time of high luminance shooting, for example, the center points 14d and 15d of the high luminance aperture parts 14c and 15c (hereinafter referred to as center points) simultaneously come to traverse the optical axis La of a photo-taking lens (hereinafter referred to as the optical axis) from the right and left sides of the optical axis La, respectively.

The center points 14d and 15d which thus simultaneously come to traverse the optical axis La are defined to be in phase relative to the optical axis La. Further, the fore end point e of the high luminance aperture part 14c traverses the optical axis La earlier than the center points 14d and 15d when the shutter plate 10 rotates. The phase of the fore end point e is therefore defined to be in advance of the center points 14d and 15d relative to the optical axis La.

A suction type magnet M is provided with an armature 16. When a current is applied, the armature 16 is sucked or attracted upward. A bent piece 16a of the armature 16 then comes to hit a projection 7b provided on the clutch 7 to disengage the end part 7a of the clutch 7 from the projection 10b of the shutter plate 10. A reference numeral 17 denotes the armature shaft of the magnet M. A numeral 18 denotes a yoke. A numeral 19 denotes a coil. A numeral 20 denotes a coil shaft. A reference symbol S denotes a light receiving surface.

The operation of the conventional device is described below with reference to FIGS. 1 and 2:

When the shutter release switch of a camera which is not shown is pushed, the motor 1 is driven. The rack gear 5 is then driven through the pinion 2, the first and second reduction gears 3 and 4 to move in the direction of arrow C along the shafts 21g and 21f of the base plate 21. The clutch 7 mounted to the rack gear 5 is urged by the clutch spring 8 in the direction of arrow A. With the rack gear 5 thus driven, the end part 7a of the clutch 7 engages the projection 10b of the shutter plate 10 to cause the shutter plate 10 to turn in the direction of arrow B while following the movement of the rack gear 5.

The peripheral gear 10c of the shutter plate 10 then causes the pulse plate 11 to turn in the direction of arrow F as shown in FIG. 2 against the urging force of the spring 12. With the pulse plate 11 thus turned, the photointerrupter 13 generates pulses according to the angle of rotation of the shutter plate 10. Then, at the same time, the projections 10d and 10e of the shutter plate 10 drive the blades 14 and 15 by engaging their slots 14b and 15b, respectively. Therefore, an exposure is effected with an aperture defined jointly by the aperture holes 14a and 15a which respectively include the high luminance aperture parts 14c and 15c.

The number of pulses generated by the photointerrupter 13 increases and the aperture holes 14a and 15a move to gradually open an exposing aperture D accordingly as the shutter plate 10 turns. When the aperture D reaches a shape corresponding to the measured brightness of an object to be photographed, a current is applied to the coil 19 of the magnet M to attract the armature 16. With the armature 16 thus attracted, the bent piece 16a of the armature 16 hits the projection 7b of the clutch 7 to disengage the end part 7a of the clutch 7 from the projection 10b of the shutter plate 10 against the force of the clutch spring 8.

The return spring 12 then acts to cause the shutter plate 10 to begin to quickly turn clockwise in the returning direction which is reverse to the direction of arrow B as shown in FIG. 1. The aperture holes 14a and 15a of the blades 14 and 15 are closed. After that, the power supply to the coil 19 of the magnet M is cut off. After that, a current is reversely applied to the motor 1. The motor 1 then causes, via the pinion 2, the first reduction gear 3 and the second reduction gear 4, the rack gear 5 to slide back in the direction reverse to the direction of arrow C of FIG. 1. The end part 7a of the clutch 7 on the rack gear 5 then engages again the projection 10b of the shutter plate 10 to bring the device back to a state obtained before shooting.

Figure 4:
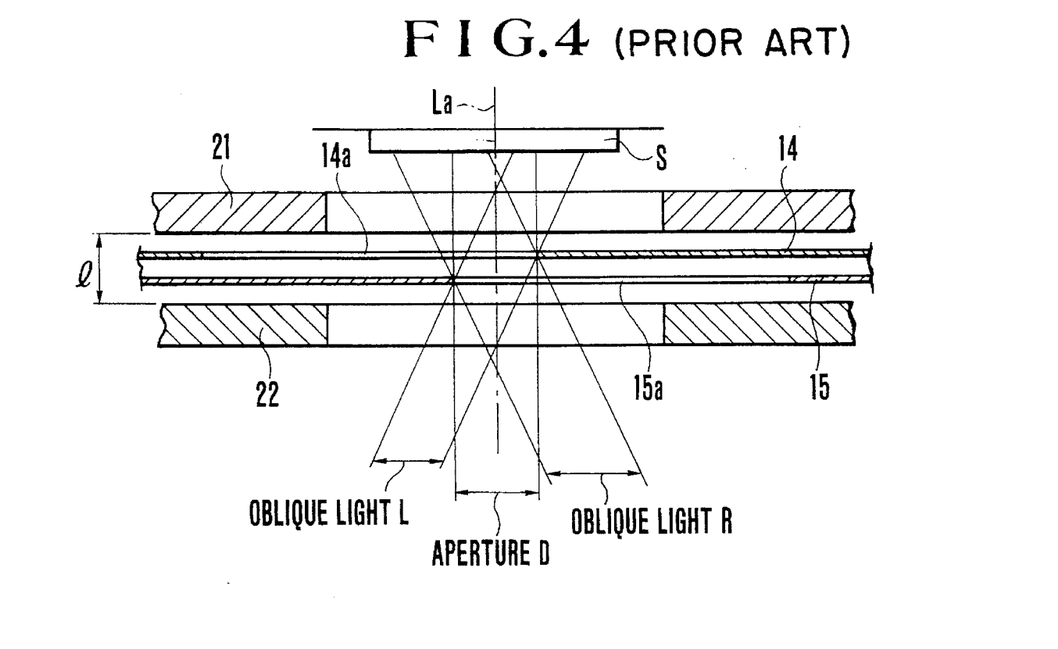
FIG. 4 shows the exposure arrangement of the conventional device.

With the conventional device arranged in the manner as described above, the two blades 14 and 15 are disposed before and behind in the direction of the optical axis La. FIG. 4 shows the arrangement of exposure effecting parts around the optical axis in a sectional view taken on a line E—E in FIG. 2.

Referring to FIG. 4, the blades 14 and 15 are disposed within a space 1 between the base plate 21 and a plate 22 (which is not shown in FIG. 1). To smoothen and stabilize the movement of the blades 14 and 15, the space 1 is arranged to leave some margins for the thicknesses of the blades 14 and 15. Therefore, the blades 14 and 15 are allowed to have some clearance between them as shown in FIG. 4.

In this instance, the shape of the aperture D is symmetric relative to the optical axis La. Therefore, while light fluxes in parallel to the optical axis La are equally incident on the right and left sides of the optical axis La, the quantities of oblique incident light fluxes R and L which are oblique relative to the optical axis La become not equal to each other. The uneven light quantities present the following problem:

In taking a shot of an object with a background of uniform luminance, such as a white wall, a scenery covered with snow or the like, the brightness of the shot taken becomes uneven between the right and left peripheral parts. This uneven brightness results from the fact that a plurality of blades having the aperture holes are disposed in different positions before and after each other in the direction of the optical axis.

Further, the adverse effect of the unevenness of the oblique incident light fluxes L and R tends to be great when the aperture is small, that is, when the luminance of the photographed object is high.

The size of the aperture decreases accordingly as the size of the light receiving part decreases. The size of the light receiving part is smaller when it is a CCD (which is a known kind of photoelectric conversion means) than when it is a film and also decreases when the size of the CCD changes from ⅔ inch to ⅓ inch and the adverse effect of the unevenness of oblique incident light fluxes also increases accordingly. Therefore, in the case of an electronic still camera or a video camera using a CCD for the light receiving part, the adverse effect of the unevenness of oblique incident light cannot be ignored.

Further, since reduction in size of the CCD for reduction in size of the above-stated apparatus has influence on the whole photo-taking lens system, it is very important to eliminate the adverse effect of the unevenness of the oblique incident light.

SUMMARY OF THE INVENTION

This invention is directed to the solution of the above-stated problem of the conventional device. It is, therefore, an object of the invention to provide a photographing device wherein the quantity of light obliquely incident upon a light receiving surface is prevented from becoming uneven due to a difference in distance from light receiving surface between the positions of a plurality of blades in the direction of an optical axis.

To attain this object, a photographing device of the kind having a plurality of blades disposed one after another in an overlapping manner in the direction of the optical axis of a photo-taking lens, with an exposing aperture part for high luminance included in an exposing aperture hole formed in each of the blades, and performing exposure control for an exposure surface by driving and moving the blades relative to each other in the direction of traversing the optical axis is arranged according to this invention, as an embodiment thereof, as follows: the fore end positions, relative to the optical axis, of the exposing aperture parts for high luminance included in the exposing aperture holes formed respectively in the blades are arranged to be located farther away from the optical axis accordingly as the blades are located farther away from the exposure surface; and, in addition to that arrangement, the fore end positions, relative to the optical axis, of the exposing aperture parts for high luminance included in the exposing aperture holes formed in the plurality of blades are set in such positions that the quantities of oblique incident light which are obtained from the high luminance exposing aperture parts and gradually increase accordingly as the blades are located farther away from the exposure surface are corrected to be equal to the quantity of oblique incident light which is obtained from the high luminance exposing aperture part of one of the blades located nearest to the exposure surface, so that the above-stated object of the invention can be attained.

In the photographing device arranged according to this invention as mentioned above, the fore end positions, relative to the optical axis, of the high luminance exposing aperture parts of the exposing aperture holes formed respectively in the plurality of blades are arranged to be located farther away from the optical axis accordingly as the blades are located farther away from the exposure surface; and the fore end positions are set in such positions that the quantities of oblique incident light which are obtained from the high luminance exposing aperture parts and gradually increase accordingly as the blades are located farther away from the exposure surface are corrected to be equal to the quantity of oblique incident light which is obtained from the high luminance exposing aperture part of one of the blades located nearest to the exposure surface. Therefore, a high-quality picture of an object can be taken even if the luminance of the object is high and uniform, as the quantity of oblique incident light on the peripheral area of a light receiving (exposure) surface is made uniform.

A photographing device of the kind having a plurality of blades disposed one after another in an overlapping manner in the direction of the optical axis of a photo-taking lens, with an exposing aperture part for high luminance included in an exposing aperture hole formed in each of the blades, and performing exposure control for an exposure surface by driving and moving the blades relative to each other in the direction of traversing the optical axis is arranged according to this invention, as another embodiment thereof, as follows: the shapes of the exposing aperture parts for high luminance included in the exposing aperture holes formed respectively in the blades are arranged to be smaller accordingly as the blades are located farther away from the exposure surface. In addition to that arrangement, the shapes of the high luminance exposing aperture parts of the exposing aperture holes formed in the blades are set respectively at such dimensions that the quantities of oblique incident light which are obtained from the high luminance exposing aperture parts and gradually increase accordingly as the blades are located farther away from the exposure surface are corrected to be equal to the quantity of oblique incident light which is obtained from the high luminance exposing aperture part of one of the blades located nearest to the exposure surface, so that the above-stated object of the invention can be attained.

As mentioned above, the photographing device according to this invention is arranged to have the high luminance exposing aperture parts of the exposing aperture holes in the plurality of blades formed not only to be smaller accordingly as the blades are located farther away from the exposure surface but also to be at such dimensions that the quantities of oblique incident light which are obtained from the high luminance exposing aperture parts and gradually increase accordingly as the blades are located farther away from the exposure surface are corrected to be equal to the quantity of oblique incident light which is obtained from the high luminance exposing aperture part of one of the blades located nearest to the exposure surface. Therefore, a shot of an object can be taken with a high-picture quality even if the luminance of the object is high and uniform, as the quantity of oblique incident light on the peripheral area of a light receiving (exposure) surface is made uniform.

The above and other objects and features of the invention will become apparent from the following detailed description of embodiments thereof taken in conjunction with the accompanying drawings.

DETAILED DESCRIPTION OF THE PREFERRED EMBODIMENTS

Figure 5:
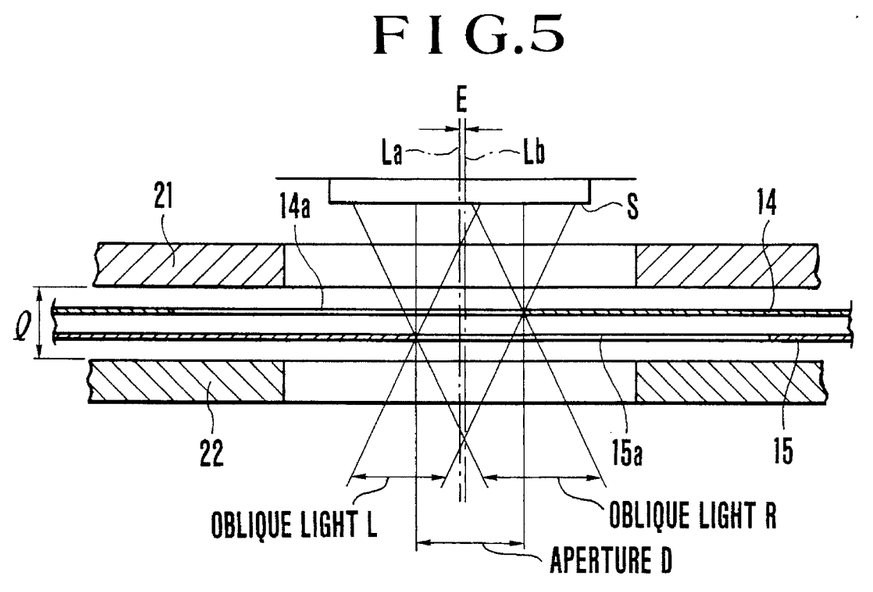
FIG. 5 is a sectional view showing the exposure arrangement of a photographing device which is arranged as an embodiment of this invention.
Figure 6A:
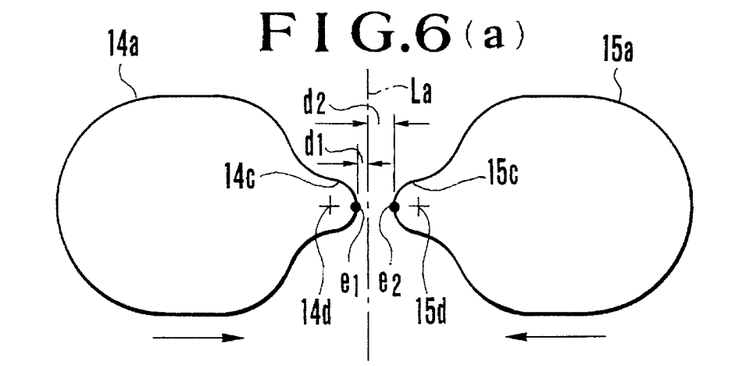
FIGS. 6(a) and 6(b) show the arrangement of the exposing aperture holes of the same embodiment.
Figure 6B:
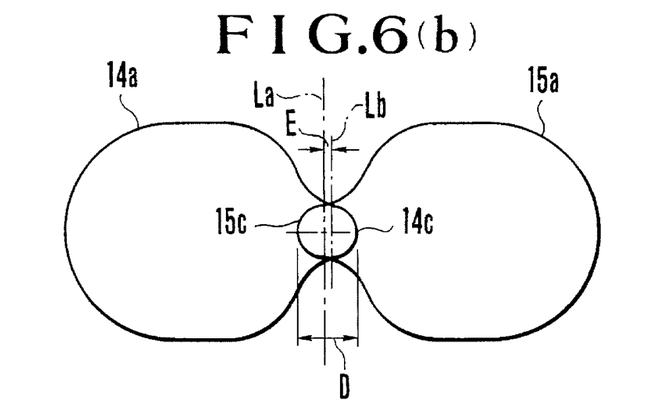

The embodiments of this invention are described by way of example below with reference to the drawings:

FIG. 5 shows the exposure arrangement of a photographing device which is arranged according to this invention as an embodiment thereof. FIGS. 6(a) and 6(b) show the arrangement of the exposing aperture parts of the same device. In these figures, the parts which are the same as or corresponding to the parts of the conventional device described in the foregoing are indicated by the same reference numerals and symbols.

The arrangement of the exposure control mechanism and the driving method of the embodiment are similar to those of the conventional device and are, therefore, omitted from the following description.

In FIGS. 5, 6(a) and 6(b), reference symbols d1 and d2 respectively denote distances from the fore end parts e1 and e2 of high luminance aperture parts 14c and 15c of aperture holes 14a and 15a to the optical axis La. A symbol Lb denotes the center axis of an exposing aperture D. The aperture holes 14a and 15a are of exactly the same shape and are symmetrically arranged on the right and left sides of the center axis Lb. However, the phase of the aperture hole 14a relative to the optical axis La is more advanced than that of the other aperture hole 15a. In other words, the aperture hole 14a is located in a position where the distance d1 between the fore end e1 of the high luminance aperture part 14c and the optical axis La is shorter than the distance d2 between the fore end e2 of the high luminance aperture part 15c and the optical axis La. In other words, when the fore end part e1 of the high luminance aperture part 14c reaches the optical axis La with the blades 14 and 15 moved, the fore end part e2 of the other high luminance aperture part 15c has not reached the optical axis La yet. Therefore, in the case of high luminance shooting, the shape of the exposing aperture D becomes asymmetric relative to the optical axis La as shown in FIG. 6(b). In FIG. 6(b), a reference symbol E denotes a distance obtained in this instance between the optical axis La and the center axis Lb of the exposing aperture D. The center axis Lb of the exposing aperture D deviates to the right as much as the distance E from the optical axis La. A symbol S denotes an exposure surface.

Then, the sectional shape of the device which is obtained at the time of an exposure along the line E—E of FIG. 2 becomes as shown in FIG. 5. In this instance, as regards the quantities of light obliquely incident relative to the optical axis La, the quantity of an oblique incident light flux R from the right side of the optical axis is also greater than that of the oblique incident light flux L from the left side, like in the case of FIG. 4. Therefore, a greater quantity of incident light is obtained on the left side of the light receiving (or exposure) surface S. However, at the time of exposure, the exposing aperture D leaves a greater area on the right side of the optical axis than the left side. Therefore, a greater quantity of incident light which is in parallel to the optical axis La falls on the right side to compensate or correct any adverse effect of the difference in quantity between the left and right oblique incident light fluxes L and R. In other words, the embodiment gives uniform and even brightness to the whole peripheral area of the exposure surface S in shooting an object of uniform luminance by virtue of the arrangement: the distance d2 between the optical axis La and the fore end e2 of the high luminance aperture part 15c of the blade 15 which is located farther away from the exposure (light receiving) surface S is set to be longer than the distance d1 between the optical axis La and the fore end e1 of the high luminance aperture part 14c of the blade 14 which is located nearer to the exposure surface S.

Referring to FIGS. 5, 6(a) and 6(b), when the left and right blades 14 and 15 are driven, the fore end e1 of the high luminance aperture part 14c of the blade 14 which is located nearer to the exposure surface S reaches the optical axis La and opens earlier as much as the advanced extent of phase relative to the optical axis than the fore end e2 of the high luminance aperture part 15c of the blade 15 which is located farther away from the exposure surface S. Following this, the fore end e2 of the high luminance aperture part 15c of the blade 15 located farther away from the exposure surface S reaches the optical axis La. The blades 14 and 15 are further driven to open the aperture holes 14a and 15a according to the measured luminance of the object to be photographed. The operation of the embodiment after opening the aperture is performed in the same manner as the conventional device and is, therefore, omitted from the following description.

With the embodiment arranged as described above, unevenness in the quantity of light received on the peripheral area of the exposure surface S is effectively corrected to render uniform the brightness of the peripheral area in a case where the luminance of the object to be photographed is high and uniform (especially, in this case, the adverse effect of the unevenness in the quantity of oblique incident light is great). The invented arrangement thus permits taking a uniformly high-quality picture of an object having a high and uniform luminance.

The embodiment described above is arranged to use, by way of example, a shutter which consists of two blades and functions also as a diaphragm. However, it is apparent that the invention can be more advantageously applied to a photographing device using a greater number of blades than two blades. Further, the invention is of course effectively applicable to a device using the blades solely for a diaphragm.

In accordance with this invention, as described above, the fore end positions, relative to the optical axis of a photo-taking lens, of the aperture parts for high luminance included in the exposing aperture holes formed in a plurality of blades provided for the exposure control in the photographing device are arranged to be located farther away from the optical axis of the photo-taking lens accordingly as the blades are located farther away from the exposure surface. In addition to this, the fore end positions are set at such points that the quantities of oblique incident light which are obtained from the high luminance exposing aperture parts and gradually increase accordingly as the blades are located farther away from the exposure surface are corrected to be equal to the quantity of oblique incident light which is obtained from the high luminance exposing aperture part of one of the blades located nearest to the exposure surface. Therefore, in shooting an object of high and uniform luminance, oblique incident light can be allowed to uniformly fall on the peripheral area of the exposure (light receiving) surface, so that a picture of an object of high and uniform luminance can be taken with uniform high-picture quality.

Further, since all the exposing aperture holes can be allowed to have the same shape, a trimming die can be used in common for the exposing aperture holes which require a high degree of precision in making the blades. Therefore, compared with the method of correcting the quantity of oblique incident light by varying the shape of exposing aperture holes, the embodiment permits a great improvement in production efficiency and machining precision. The arrangement of the embodiment not only enhances the quality and performance of the photographing device but also permits a miniaturization of the device.

Figure 7:
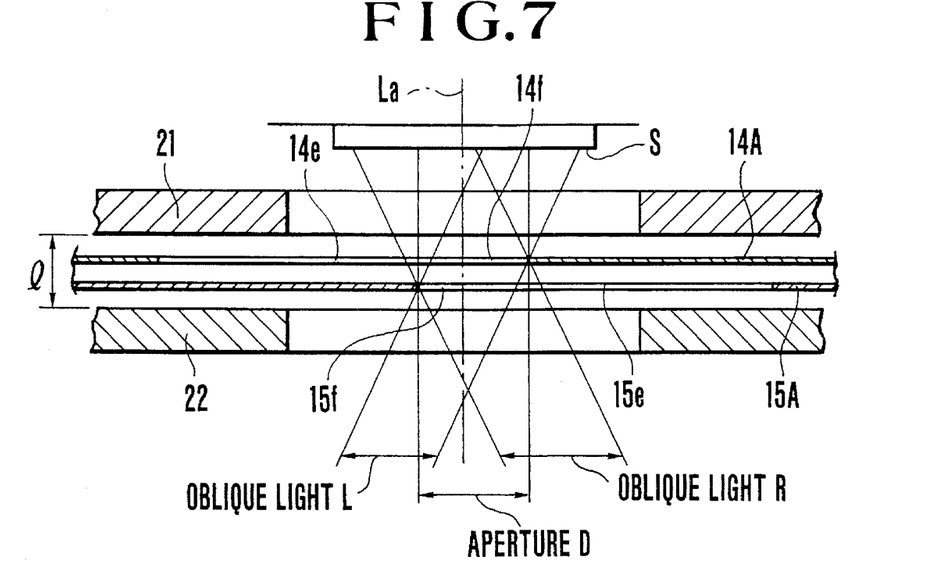
FIG. 7 is a sectional view showing the essential parts of a photographing device arranged as another embodiment of the invention.
Figure 8A:
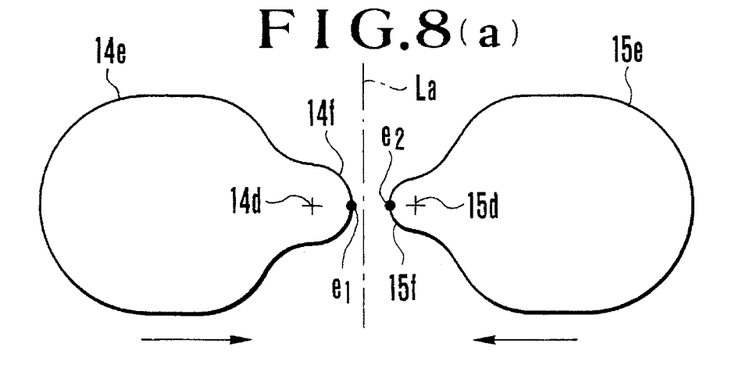
FIGS. 8(a) and 8(b) show the shapes of exposing aperture parts formed in the blades of the embodiment shown in FIG. 7.
Figure 8B:
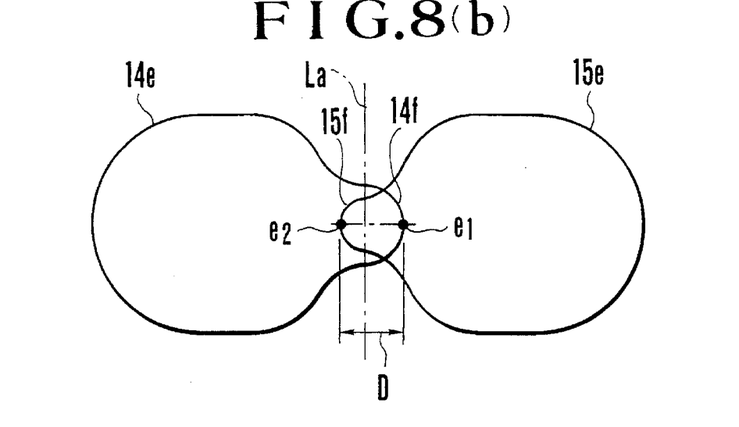

Next, another embodiment of this invention is described below with reference to the drawings:

FIG. 7 shows in a sectional view the essential component parts of the exposure control arrangement of a photographing device which is arranged as an embodiment of the invention. FIGS. 8(a) and 8(b) show the shapes of exposing aperture parts formed in the blades of the same embodiment. In these figures, all the parts corresponding to the parts of the conventional device described in the foregoing are indicated by the same reference numerals and symbols. Further, the arrangement of the exposure control mechanism and the driving method of the embodiment are similar to the conventional device and are, therefore, omitted from the following description.

Referring to FIGS. 7, 8(a) and 8(b), two blades 14A and 15A are respectively provided with exposing aperture holes (hereinafter referred to as aperture holes) 14e and 15e. The aperture hole 14e includes an exposing aperture part for high luminance (hereinafter referred to as a high luminance aperture part) 14f which is arranged to be in a larger shape than a high luminance aperture part 15f which is included in the other aperture hole 15e. These high luminance aperture parts 14f and 15f respectively have center points 14d and 15d which are arranged to be in phase relative to an optical axis La in the same manner as defined in the foregoing.

In shooting, the shape and dimension of an exposing aperture D become as shown in FIG. 8(b). The aperture D thus formed is asymmetric relative to the optical axis La. Therefore, with the blades 14A and 15A driven for an exposure, the light receiving shape of an exposure surface S becomes as shown in FIG. 7. In this case, the quantity of a light flux R obliquely incident from the right side of the optical axis La is greater than that of a light flux L obliquely incident from the left side. However, the exposing aperture D is formed to have a greater area on the right side to allow light which comes in parallel to the optical axis La to be incident in a greater quantity on the right side and also to widen the incident range of oblique incident light on the right side. Therefore, the unevenness of the oblique incident light on the peripheral area of the exposure surface is corrected by the larger area on the right side of the exposing aperture D. In other words, the shape of the high luminance aperture part 15f of the blade 15A which is farther away from the exposure surface S is arranged to be smaller than the high luminance aperture part 14f of the blade 14A in such a manner that a uniform brightness is obtained for the peripheral area of the exposure surface S in shooting an object of uniform luminance.

The embodiment which is arranged in this manner operates as follows: the shape of the high luminance aperture part 15f of the blade 15A which is located farther away from the exposure surface S is arranged to be smaller than that of the high luminance aperture part 14f of the blade 14A which is located nearer to the exposure surface S in such a way as to correct the unevenness in the quantity of oblique incident light as mentioned above. When the left and right blades 14A and 15A are driven, therefore, the fore end part e1 of the high luminance aperture part 14f the phase of which is ahead of that of the fore end part e2 of the high luminance aperture part 15f in relation to the optical axis La comes to open earlier than the fore end part e2 as much as the extent of the advanced phase. Following the fore end part e1, the fore end part e2 of the high luminance aperture part 15f reaches the optical axis La. The exposing aperture D is opened as shown in FIG. 8(b) with the blades 14A and 15A further driven.

Then, the exposing aperture D opens to a greater amount on the right side which has a greater quantity of oblique incident light to correct the unevenness in the quantity of oblique incident light. Upon completion of exposure, the blades 14A and 15A are driven by the action of a return spring to quickly close the aperture holes 14e and 15e as described in the foregoing.

Since the unevenness, relative to the optical axis, in the quantity of light incident on the exposure surface resulting from a difference in position between the blades 14A and 15A in the direction of the optical axis is corrected in the above-stated manner, the peripheral part of the light receiving (exposure) surface S is uniformly exposed. Therefore, a shot of an object can be taken without any unevenness in the quantity of light received even if the object is of a high and uniform luminance.

The arrangement of the embodiment described thus enhances the photographing performance of the device and permits a miniaturization of an electronic still camera or a video camera.

In the case of the embodiment, the photographing device is arranged, by way of example, to use a shutter which consists of two blades and functions also as a diaphragm. However, it is apparent that the invented arrangement will be more advantageously applied to a device where the diaphragm consists of a greater number of blades than two blades. Further, the invention is of course effectively applicable also to a device where the blades are arranged to be used solely for the diaphragm.

As described above, in accordance with this invention, the exposing aperture parts for high luminance which are included respectively in the exposing aperture holes formed in a plurality of blades arranged one after another in an overlapping manner, in the direction of the optical axis, are formed to be smaller in size accordingly as the blades are located farther away from the exposure surface such as the light receiving surface of a CCD or the like; and, in addition to that, the sizes of the high luminance exposing aperture parts are set at such dimensions that the quantities of oblique incident light which are obtained from the high luminance exposing aperture parts and gradually increase accordingly as the blades are located farther away from the exposure surface are corrected to be equal to the quantity of oblique incident light which is obtained from the high luminance exposing aperture part of one of the blades located nearest to the exposure surface. Therefore, even in taking a shot of an object of high and uniform luminance, the unevenness in the quantity of light obliquely incident on the peripheral area of the light receiving (exposure) surface can be effectively corrected to give a high-quality picture.

The arrangement of the embodiment not only enhances the performance of the photographing device but also permits a miniaturization of an electronic still camera or a video camera.

What is claimed is:

1. A photographing device having a plurality of blades disposed one after another in an overlapping manner in the direction of an optical axis of a photo-taking lens, with an exposing aperture part for high luminance included in an exposing aperture hole formed in each of said blades, and performing exposure control for an exposure surface by driving and moving said blades relative to each other in the direction of traversing the optical axis, characterized in that:

fore end positions, relative to the optical axis, of said exposing aperture parts for high luminance included in said exposing aperture holes formed respectively in said blades are arranged to be located farther away from the optical axis accordingly as said blades are located farther away from the exposure surface, and wherein the exposing aperture holes are arranged to adjust an amount of light incident through said photo-taking lens.

2. A device according to claim 1, wherein the force end positions, relative to the optical axis, of said exposing aperture parts for high luminance included in said exposing aperture holes formed in said plurality of blades are set in such positions that the quantities of oblique incident light which are obtained from said high luminance exposing aperture parts and gradually increase accordingly as said blades are located farther away from the exposure surface are corrected to be equal to the amount of oblique incident light which is obtained from said high luminance exposing aperture part of one of said blades located nearest to the exposure surface.

3. A photographing device having a plurality of blades disposed one after another in an overlapping manner in the direction of an optical axis of a photo-taking lens, with an exposing aperture part for high luminance included in an exposing aperture hole formed in each of said blades, and performing exposure control for an exposure surface by driving and moving said blades relative to each other in the direction of traversing the optical axis, characterized in that:

shapes of said exposing aperture parts for high luminance included in said exposing aperture holes formed respectively in said blades are arranged to be smaller accordingly as said blades are located farther away from the exposure surface and wherein the exposing aperture holes are arranged to adjust an amount of light incident through said photo-taking lens.

4. A device according to claim 3, wherein the shapes of said high luminance exposing aperture parts of said exposing aperture holes formed in said blades are set respectively at such dimensions that the quantities of oblique incident light which are obtained from said high luminance exposing aperture parts and gradually increase accordingly as said blades are located farther away from the exposure surface are corrected to be equal to the quantity of oblique incident light which is obtained from said high luminance exposing aperture part of one of said blades located nearest to the exposure surface.

* * * * *

UNITED STATES PATENT AND TRADEMARK OFFICE
CERTIFICATE OF CORRECTION

PATENT NO. : 5,502,525
DATED : March 26, 1996
INVENTOR(S) : Yoshiyuki Mizoguchi

It is certified that error appears in the above-indentified patent and that said Letters Patent is hereby corrected as shown below:

Col. 10, line 7, change "force" to -- fore --.

Signed and Sealed this

Thirtieth Day of July, 1996

Attest:

BRUCE LEHMAN

*Attesting Officer*     *Commissioner of Patents and Trademarks*